Patented Apr. 5, 1949

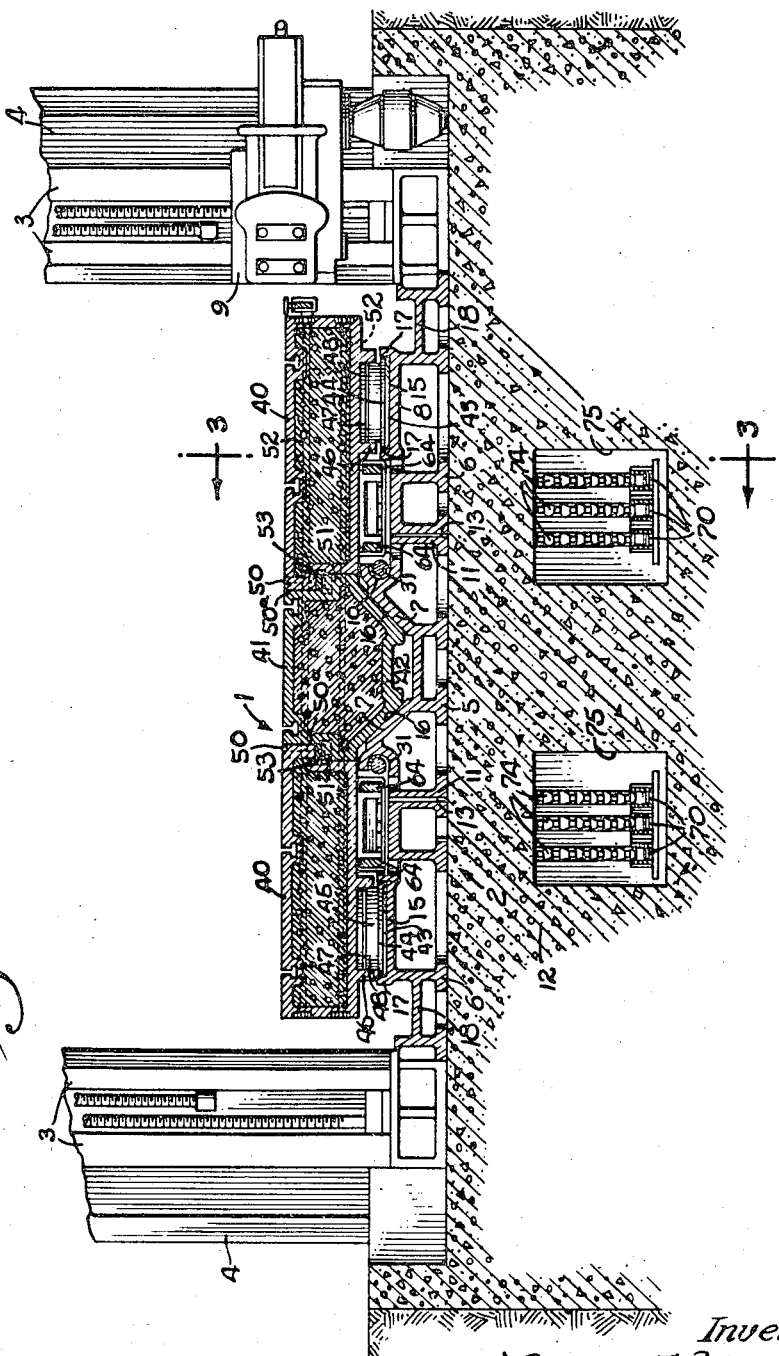

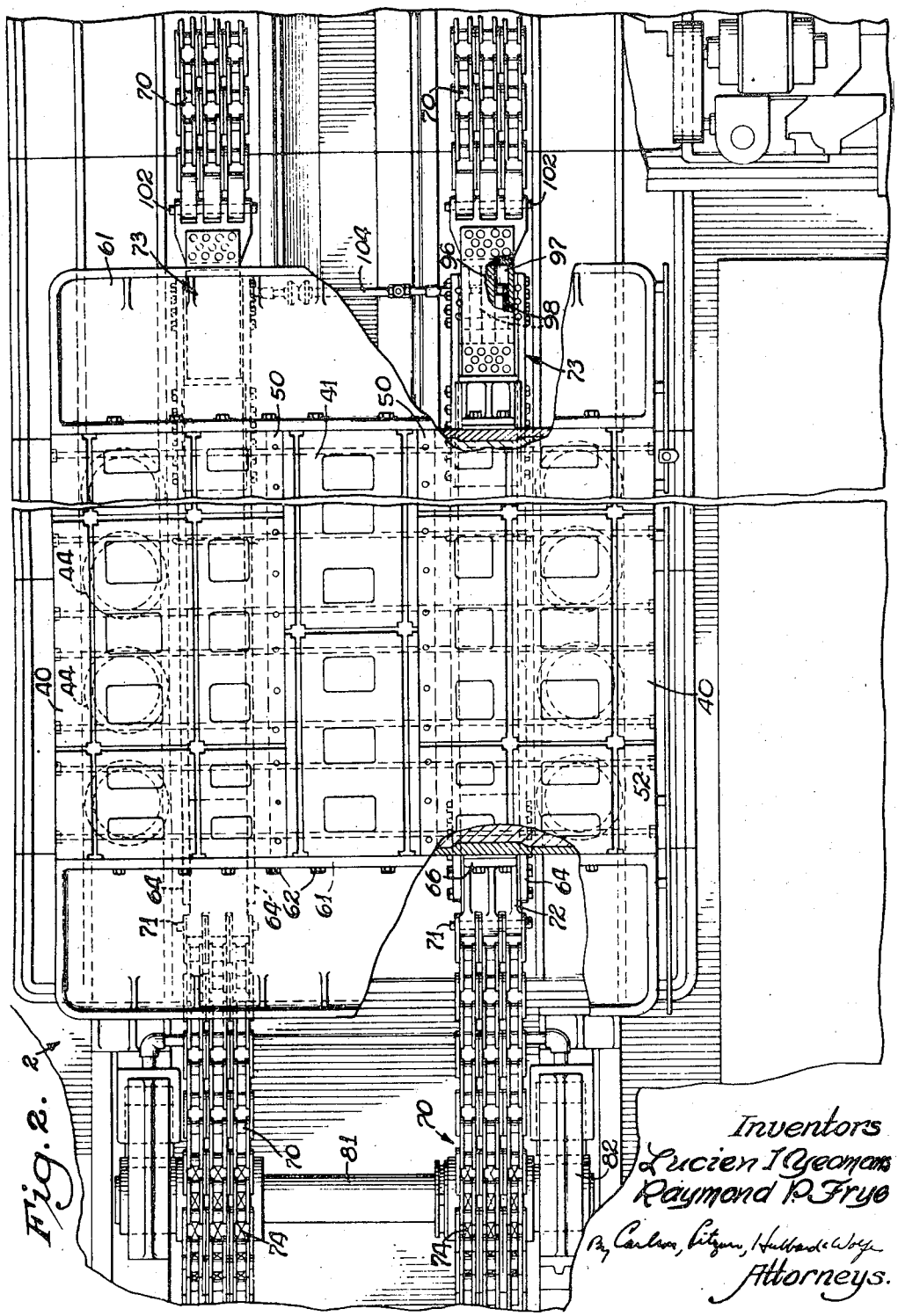

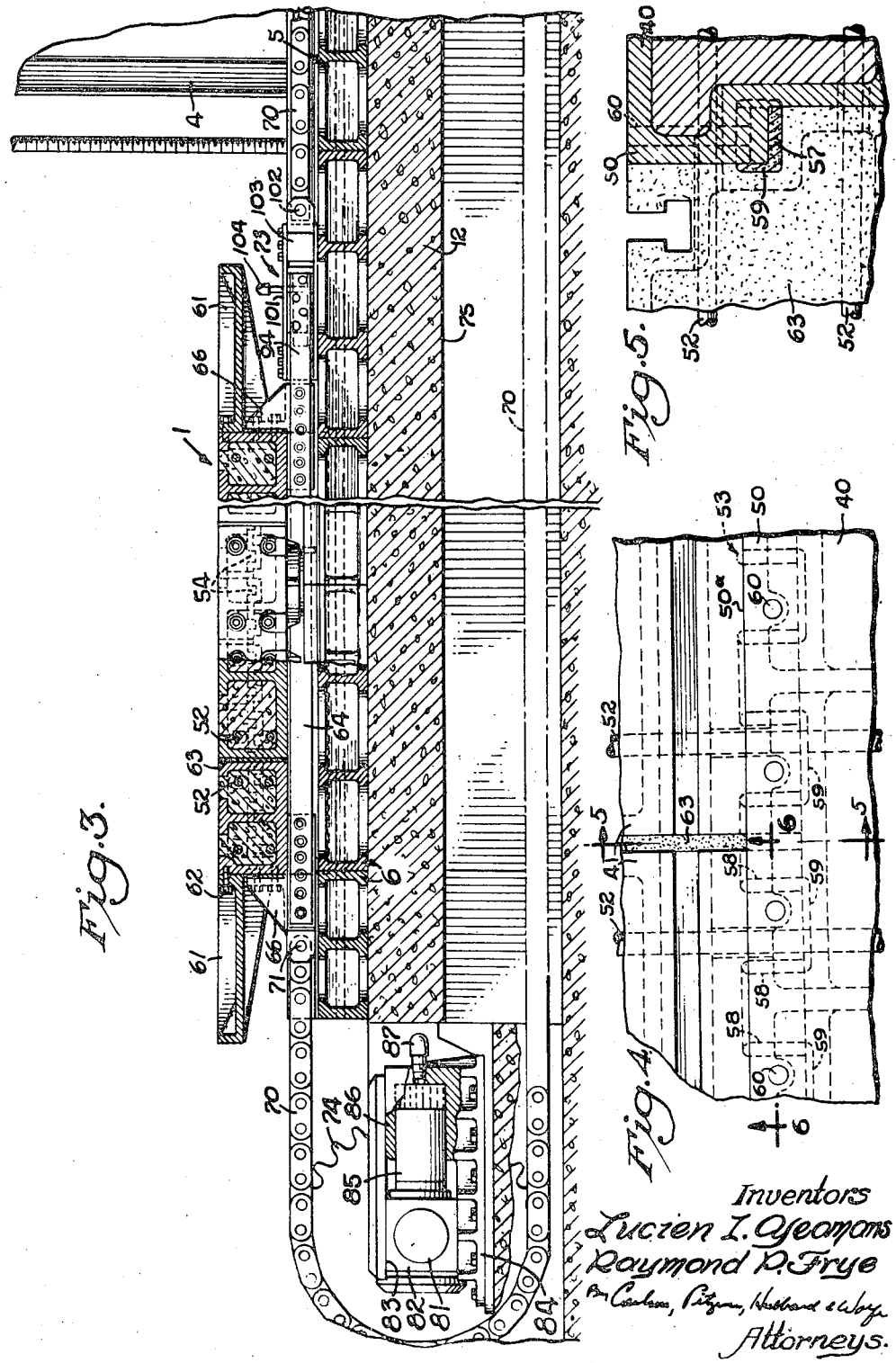

2,466,631

UNITED STATES PATENT OFFICE 2,466,631

SECTIONAL TABLE FOR MACHINE TOOLS

Lucien I. Yeomans and Raymond P. Frye, Chicago, Ill., assignors to Lucien I. Yeomans, Inc., Chicago, Ill., a corporation of Illinois Original application September 24, 1943, Serial No. 503,630. Divided and this application July 12, 1945, Serial No. 604,551

7 Claims. (Cl. 90—58)

The present application is a division of our copending application Serial No. 503,630, filed September 24, 1943.

The present invention relates generally to machine tools such, for example, as planers and milling machines, and more particularly to the work supporting tables therefor.

One general object of the present invention is to provide a novel machine tool having a reciprocable work table which is simple and inexpensive to construct in large sizes because of its novel sectional construction, and which may be constructed largely in the location where the machine tool is to be used.

Another object is to provide such a machine tool work table divided both laterally and longitudinally into sections having unmachined abutting edges interconnected in a novel way to form a rigid unitary structure.

Further objects and advantages of the invention will become apparent from the following detailed description taken in connection with the accompanying drawings in which:

Figure 1 is a fragmentary transverse sectional view of the table and tool supporting columns of a machine tool embodying the novel features of the present invention.

Fig. 2 is a fragmentary plan view of the table.

Fig. 3 is a partial section taken along the line 3—3 of Fig. 1.

Fig. 4 is an enlarged view of a portion of Fig. 2.

Figure 6:
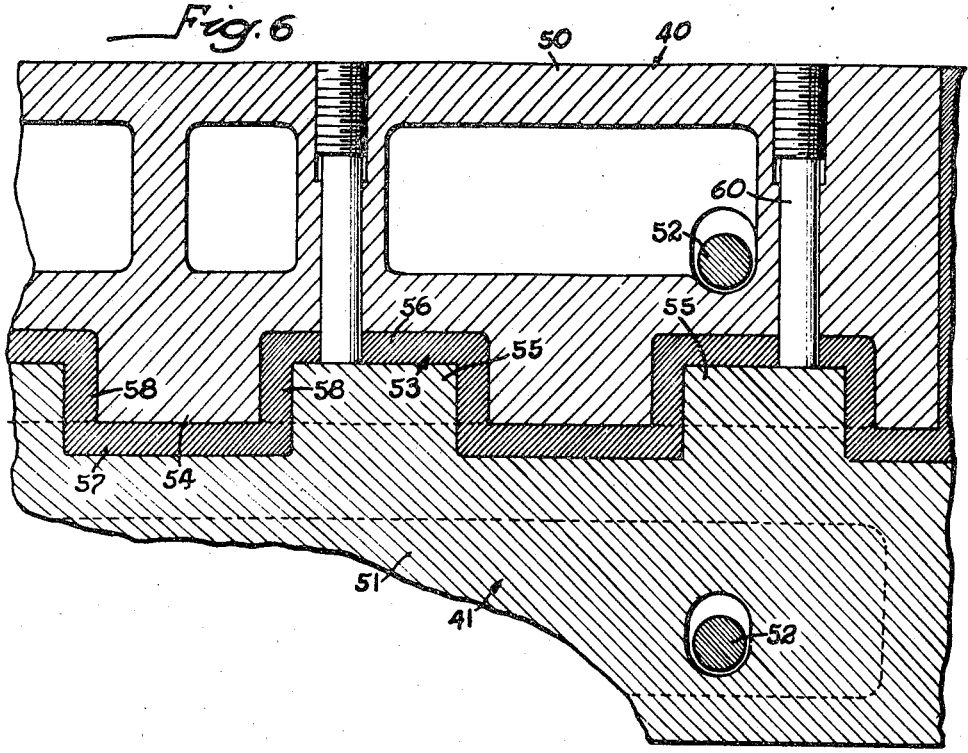

Figs. 5 and 6 are fragmentary sectional views taken along the lines 5—5 and 6—6, respectively, of Fig. 4.

Figure 7:
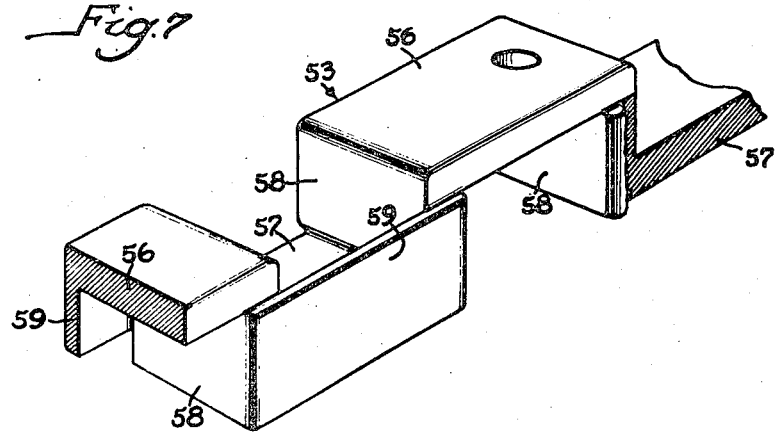

Fig. 7 is a fragmentary perspective view of a key for locking the table sections together.

While the invention is susceptible of various modifications and may be practiced in various ways, we have illustrated in the drawings and will describe here in detail the preferred embodiment and method. It is to be understood, however, that we do not intend to limit the invention by such specific disclosure but aim to cover all modifications, alternative constructions, methods, and uses falling within the spirit and scope of the invention as expressed in the appended claims.

In the drawings, the invention is embodied for purposes of illustration in the table 1 of a planer or milling machine, the table being of substantial size and having a long range of longitudinal reciprocation. The top of the table is T-slotted in the usual way to permit the clamping thereto of workpieces which are machined by tools mounted in heads 9 which are fed vertically along ways 3 on columns 4 or along a crossrail in the case of certain types of milling machines.

The table 1 has been shown as mounted on a supporting bed 2 which, in the present instance, is divided both laterally and longitudinally of the direction of table travel into separate sections 5 and 6 in the form of hollow castings ribbed both laterally and longitudinally. The center or intermediate sections 5 are arranged end to end and are cast with a top wall 7 having laterally spaced downwardly converging portions. Outwardly opening grooves 10 of generally semi-circular cross-section are cast in the section 5, these grooves being spaced inwardly from the vertical side walls 11 of the section. The sections 6 are arranged end to end along the sides 11 of the intermediate sections 5 just out of edgewise abutment with the latter and out of longitudinal abutment with each other. Each has a generally flat top wall formed with laterally spaced upstanding ribs 17 intermediate its sides. Along the outer side is a depressed portion 18 which alines with the corresponding portions of the row of sections 6 to form a trough extending the full length of the bed. The use of such trough in erecting and machining the bed is disclosed in our Patent No. 2,419,868, granted April 29, 1947, and which is also a division of our application Ser. No. 503,630, mentioned previously herein. But since the present is concerned primarily with the table no further attention need be given the details of erecting the illustrated bed.

In accordance with the present invention table 1 is of sectional construction and may be built up on the bed structure after the latter has been erected at the final location where the machine tool is to be used. The table is composed of two rows of side sections 40 arranged on opposite sides of a row of intermediate sections 41, the sections of each row being arranged end to end longitudinally of the table and preferably are separated sufficiently (see Figs. 2 and 4) to avoid the necessity of machining the adjacent surfaces of the castings.

The bottoms of the intermediate sections 41 complement the ways 16 and for this purpose are cast with a depending longitudinal rib 42 whose inclined sides are machined accurately to the same V-shape as the ways 16 into which the ribs fit. The sections thus supported are held effectually against lateral displacement during their sliding movement.

Along its outer margin, each side section 40 is supported on one of the bed ways 15 over two flat areas defined by the bottom surfaces 43 of generally circular buttons 44 (Figs. 1 and 2) projecting from the bottom of the section adjacent the outer edges of the latter and mounted on the section for some degree of universal movement whereby to permit the buttons to adapt themselves automatically to the bed ways. Herein, the upper portions 45 of the buttons have peripheries machined to a slightly spherical contour and fitting in the internal bore of annular flanges 46 cast on the bottom of the table section. To provide the universal connection, the space between the closed end of the bore and the button is filled with a yieldable or flowable material such as readily pliable synthetic rubber in the form of a layer 47 separated from the button by a thin metal disk 48 that fits closely in the bore. In this way, the weight of each section is sustained by the non-compressible material and is distributed uniformly over the bottom surfaces of the buttons without the necessity of locating the latter accurately by preliminary machining.

Along their inner edges, the side sections 40 are supported by the center sections 41. For this purpose, the upper half portion 50 (Figs. 1 and 5) of the side wall on the section 40 projects beyond the lower portion of this section, and similarly, the lower portion 51 at the side of the center sections 41 projects beyond the upper portion so as to underlie the portions 50. Preferably, the laterally facing surfaces of all four of these portions are machined accurately as to lateral spacing and parallelism so as to fit against each other in abutting edge to edge relation as shown in Fig. 1 and indicated at 50ª. This relation is maintained by upper and lower rows of tie bolts 52 extending transversely through the sections 40 and 41 of the three rows.

The side and center sections are locked together in a novel manner by casting a key 53 (Fig. 7) in spaces formed between squared projections 54 depending from the edge portions 50 of the sections 40 and similar intervening projections 55 upstanding from the underlying portions 51 of the sections 41, each projection on one part being smaller than the notch on the other part into which it projects thereby forming horizontal and vertical spaces in which horizontal parts 56 and 57 and vertical parts 58 of the key 53 are formed. The latter also includes a part 59 connecting the parts 58 on one side of the key as shown in Fig. 7. Thus, the portions 50 of the sections 40 are supported on the portions 51 of the center sections by the horizontal parts 56 and 57 of the key, while the vertical parts 58 of the key serve to lock the adjacent sections 40 and 41 rigidly against relative longitudinal displacement. The parts 59 hold the sections against any possible relative lateral displacement in the absence of a precise fit between the machined sides of the adjacent sections. Thus, the desired supporting and locking connection may be formed between the adjacent table sections without the necessity of machining the roughly cast surfaces of the interlocking projections 54 and 55 and simply by pouring molten type metal into the space while the sections are held in the proper relationship.

In assembling the table, the central sections 41 are placed on the ways 16 with their ends spaced apart to insure full support of each section solely by these ways. Next, the side sections are placed on the bed with their buttons 44 resting on the surfaces 15. The inner margins of these sections are temporarily supported on the center sections by screws 60 (Figs. 2, 4, 5, and 6) which thread through vertical holes in the overlying portions 50 with their lower ends bearing on the top surfaces of the projections 55. The upper and lower rows of the tie bolts 52 are then extended transversely of the table through the three rows of sections and tightened. The levelling screws 60 are adjusted as may be required in order to permit the machined edge surfaces of the sections to come into full contact as the bolts are finally tightened. Now, all of the sections will be fully supported from the ways 15 and 16 and in the exact relation they are to occupy in the final table assembly. After plugging the ends of the spaces between the sections of each row and other points from which liquid might escape, molten type metal is poured into the key spaces filling the same and flowing into all of the other interconnected spaces to form fillings 63 between the sections in each row. The two unitary keys 53 which are thus formed extend throughout the length of the table, and all sections of the three rows become locked together in a manner to resist relative movement between the sections in any direction under applied compressive stresses. The bolts 52 hold the sections against lateral separation.

At their ends, the three rows of sections 40 and 41 are connected by rigid castings 61 extending across the ends and fastened thereto by cap screws 62. To hold the sections of each row against longitudinal separation and provide means by which a driving force may be applied to the table, two pairs of bars 64 (Figs. 1, 2, and 3) extend longitudinally of the table beneath the inner edge portions of the sections 40. At their ends, the bars of each pair are secured by bolts 65 to brackets 66 which abut against the table ends and are bolted. The spaces between the brackets and the table ends are filled with type metal 67 so as to avoid machining of the ends of the table sections. The table constructed as above described constitutes a rigid structure which is slidable along the bed ways with the precision required in present day machine tools, and this, in spite of the fact that the table is divided both longitudinally and laterally into rows of comparatively small sections which are held together rigidly and accurately with a minimum of preliminary machining. After the table has been built up in this way at the location where the machine tool is to be used, its top surface may be machined to provide a perfectly flat horizontal work supporting surface by using the regular tools of the machine tool. In a similar way the usual T-slots may be formed in the table top.

In view of the substantial size and weight of the table, special means is provided for moving it back and forth along the bed ways. Such drive means constitutes, however, the subject matter of our co-pending application Ser. No. 503,630 previously noted, and of which this present application is a division. Consequently the drive mechanism has not been here shown in detail. For the present suffice it to say that the actuating force for moving the table 1 is applied to the bar 64 thereby pushing instead of pulling the table so as to avoid any tendency to separate the sections. For that purpose the actuating means may comprise two sets of three roller type chains 70 having one of their ends connected by pivot pins 71 to tail pieces 72 projecting from the bracket 66 (Figs. 2 and 3). At the other end of the table, the chain ends are connected to the bracket 66 through the intermediary of adjusting devices designated generally as 73. From these points of anchorage, the chains extend away from the table in one direction, around sprockets 74 (Figs. 2 and 3) then underneath the table and the bed through passages 75 in the foundation, around suitable motor driven sprockets (not shown) at the other end of the bed, and finally reversely to the second end of the table through the tensioning devices 73. To retain the chains taut the shaft 81 for sprockets 74 (Fig. 3) are journaled in blocks 82 slidable in guides 83 on a base 84 and urged to move in a chain tensioning direction by fluid actuated pistons 85 in cylinders 86 connected to a source of fluid pressure (not shown) by pipes 87.

We claim as our invention:

1. In a machine tool, a table structure comprising, in combination, a first table section having a projecting lateral edge portion off-set below the top surface of the section, said edge portion being formed with alternate upstanding lugs and upwardly facing notches, a second table section having a projecting lateral edge portion overlying the edge portion of the first section and formed with alternate depending lugs and downwardly facing notches adapted to interfit with the first mentioned notches and lugs while leaving spaces between the opposed surfaces of the lugs on the two sections, and a metal key cast directly in said spaces whereby to support the first section from the second section and lock the two sections against relative displacement along the edges.

2. In a machine tool, a table structure comprising, in combination, a first table section having a lateral edge portion projecting outwardly beyond the top part of the section, a second table section having a projecting lateral edge portion overlying the edge portion of the first section, and a key cast directly in the space between the edge portions of the sections operative to hold the sections in fixed relation.

3. In a machine tool, a table having, in combination, two cast metal sections disposed edge to edge with a projecting part on one section underlying a projecting part on the other section and vertically spaced from the first part, and a key cast in the space between said parts so that the first section is supported from the second section.

4. In a machine tool, a table having, in combination, two cast metal sections disposed edge to edge with a projecting part on one section underlying a projecting part on the other section and vertically spaced from the first part, said projecting parts providing horizontal spaces between each other and having portions spaced along the edges thereof and providing upright spaces communicating with the horizontal spaces, and a filling cast into said spaces.

5. In a machine tool, a table having, in combination, two cast metal sections disposed edge to edge with a projecting part on one section underlying a projecting part on the other section and vertically spaced from the first part, said projecting parts interfitting with each other to provide upwardly extending spaces spaced along the section edges, and a metal filling cast in said spaces to lock the sections against relative movement longitudinally of the edges.

6. In a machine tool, a table structure comprising, in combination, a pair of sections arranged in edge to edge relation, one of said sections having its edge portion underlying the adjacent edge portion of the other section and spaced therefrom, and a metal key cast in the space between the table sections.

7. In a machine tool, a table having, in combination, two cast metal sections disposed edge to edge with a projecting part on one section underlying a projecting part on the other section and vertically spaced from the first part, a plurality of devices on one of said sections engaging the other section to hold said parts in spaced relation and selectively adjustable to vary such spacing, and a key casting in the space between said parts and providing a supporting connection therebetween.

LUCIEN I. YEOMANS.
RAYMOND P. FRYE.

REFERENCES CITED

The following references are of record in the file of this patent:

UNITED STATES PATENTS

| Number | Name | Date |
|---|---|---|
| 673,829 | Voynow | May 7, 1901 |
| 1,309,384 | Yeomans | July 8, 1919 |